US008041856B2

(12) United States Patent
Raikar et al.

(10) Patent No.: US 8,041,856 B2
(45) Date of Patent: Oct. 18, 2011

(54) SKIP BASED CONTROL LOGIC FOR FIRST IN FIRST OUT BUFFER

(75) Inventors: Rayesh Kashinath Raikar, Karnataka (IN); Vijaya Bhaskar Kommineni, Andhra Pradesh (IN); Santosh Kumar Akula, Andhra Pradesh (IN); Ranjith Kumar Kotikalapudi, Andhra Pradesh (IN); Vinay Gangadhar, Karnataka (IN)

(73) Assignee: LSI Corporation, Milpitas, CA (US)

( * ) Notice: Subject to any disclaimer, the term of this patent is extended or adjusted under 35 U.S.C. 154(b) by 307 days.

(21) Appl. No.: 12/241,108

(22) Filed: Sep. 30, 2008

(65) Prior Publication Data

US 2010/0082910 A1 Apr. 1, 2010

(51) Int. Cl.
*G06F 3/00* (2006.01)
*G06F 13/00* (2006.01)

(52) U.S. Cl. .................. 710/52; 710/5; 710/31; 710/33

(58) Field of Classification Search ........................ None
See application file for complete search history.

(56) References Cited

U.S. PATENT DOCUMENTS

| | | | | |
|---|---|---|---|---|
| 7,362,771 | B1 * | 4/2008 | Lo et al. | 370/429 |
| 2002/0057510 | A1 * | 5/2002 | Hoskins et al. | 360/53 |
| 2007/0002991 | A1 * | 1/2007 | Thompson et al. | 375/372 |

OTHER PUBLICATIONS

Chu, Pong P., FPGA prototyping by VHDL examples: Xilinx Spartan-3 version, 2008, John Wiley and Sons, pp. 100-108 [Online, accessed Nov. 5, 2010, available from Google Books].*

* cited by examiner

*Primary Examiner* — Tatiq Hafiz
*Assistant Examiner* — Scott Sun
(74) *Attorney, Agent, or Firm* — Prakash Nama; Global IP Services, PLLC

(57) ABSTRACT

A system and method of a skip based control logic for a first in first out (FIFO) buffer is disclosed. In one embodiment, a FIFO buffer system includes a storage for storing data, a write pointer for pointing to a write address of the storage for a write operation, and a read pointer for pointing to a read address of the storage for a read operation. Further, the FIFO buffer system includes a control logic for incrementing the read pointer based on a skip parameter of a skip register. The skip parameter is used to characterize a validity of the data for the read operation.

18 Claims, 6 Drawing Sheets

SKIP BASED CONTROL LOGIC FOR FIRST IN FIRST OUT BUFFER

FIELD OF TECHNOLOGY

Embodiments of the present invention relate to the field of electronics. More particularly, embodiments of the present invention relate to a first in first out (FIFO) buffer.

BACKGROUND

A first in first out (FIFO) buffer is an electronic circuit for buffering and flow control of data. The FIFO buffer primarily includes a read pointer, a write pointer, a storage, and a control logic. The read pointer is used to point an address in the storage so that the content of the address can be accessed. The write pointer is used to point another address in the storage to store an incoming data. The storage may be a static random access memory (SRAM), flip-flops, latches, or any other suitable form of storage. The control logic performs necessary read and write pointer management, generates status flags and/or optional handshake signals.

During a read operation of the FIFO buffer, the header of the data (e.g., a data packet) is read to check the validity of the data. If the data is valid, it is further processed. However, even if the data is invalid, the FIFO buffer executes the read operation of the invalid data by means of dummy reads, thus causing latency of the read operation as well as wasting processing cycles of the firmware employed for the FIFO read operation.

SUMMARY

A system and method of a skip based control logic for a first in first out (FIFO) buffer is disclosed. In one aspect, a FIFO buffer system includes a storage for storing data, a write pointer for pointing to a write address of the storage for a write operation, and a read pointer for pointing to a read address of the storage for a read operation. The FIFO buffer system also includes a control logic for incrementing the read pointer based on a skip parameter of a skip register. For example, the skip parameter is used to characterize a validity of the data for the read operation.

In another aspect, a host controller interface (HCI) device includes an isochronous receive first in first out (IRFIFO) buffer including a storage for storing an isochronous data packet received from a guest device, a write pointer for pointing to a write address of the storage for a write operation, and a read pointer for pointing to a read address of the storage for a read operation. Further, the HCI device includes a control logic for incrementing the read pointer by a value of a skip parameter of a skip register if the isochronous data packet is not valid for the read operation.

In yet another aspect, a method for a host controller interface (HCI) includes detecting an isochronous data packet placed in an isochronous receive first in first out (IRFIFO) buffer coupled to an isochronous receive direct memory access (IRDMA), and reading a header of the isochronous data packet. Further, the method includes determining a validity of the isochronous data packet, and skipping a read operation of remaining data of the isochronous data packet if the isochronous data packet is determined as invalid.

The methods, and/or systems disclosed herein may be implemented by any means for achieving various aspects, and may be executed in a form of a machine readable medium embodying a set of instructions that, when executed by a machine, cause the machine to perform any of the operations disclosed herein.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follows.

DETAILED DESCRIPTION

A system and method of a skip based control logic for a first in first out (FIFO) buffer is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
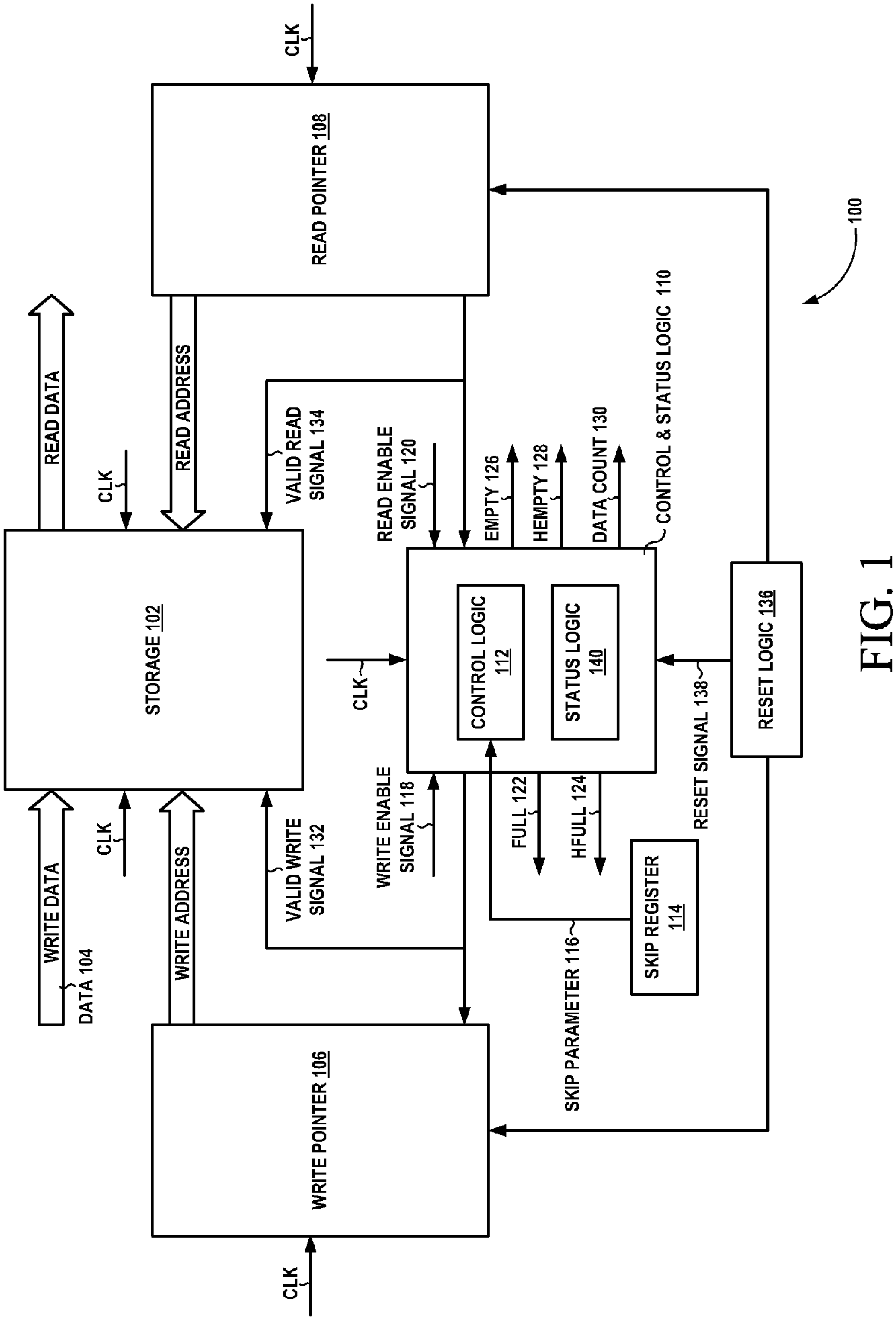
FIG. 1 is a block diagram of an exemplary first in first out (FIFO) buffer system, according to one embodiment.

FIG. 1 is a block diagram of an exemplary first in first out (FIFO) buffer system 100, according to one embodiment. As shown in FIG. 1, the FIFO buffer system 100 includes a storage 102 for storing data 104. Further, as shown in FIG. 1, the FIFO buffer system 100 includes a write pointer 106 for pointing to a write address of the storage 102 for a write operation and a read pointer 108 for pointing to a read address of the storage 102 for a read operation. In addition, as shown in FIG. 1, the FIFO buffer system 100 includes a control and status logic 110.

In one embodiment, the control and status logic 110 includes a control logic 112 for incrementing the read pointer 108 based on a skip parameter 116 of a skip register 114. It is appreciated that the skip register 114 is a configurable register which enables skipping a number of locations for a read operation. Also, the skip register 114 is a self clearing register upon performing the read operation. In one example embodiment, the skip parameter 116 is used to characterize a validity of the data 104 for the read operation. In addition, the control logic 112 performs read and write pointer management, and generates optional handshake signals for interfacing with a user logic.

Further, the control and status logic 110 includes a status logic 140 for generating memory status output signals which include FULL 122, HALF-FULL 124, EMPTY 126, and HALF-EMPTY 128. For example, the status logic 140 includes configurable registers, namely, WFIFO_HI, WFIFO_LO, RFIFO_LO and RFIFO_HI. The WFIFO_HI register sets HALF-FULL flag 124 when a data count 130 of the data 104 associated with the write operation is high. The WFIFO_HI register resets HALF-FULL flag 124 when the data count 130 of the data 104 associated with the write operation is low. The RFIFO_LO register sets HALF-EMPTY flag 128 when the data count 130 of the data 104 associated with the read operation is low. The RFIFO_HI register resets HALF-EMPTY flag 128 when the data count 130 of the data 104 associated with the read operation is high. Further, as shown in FIG. 1, the FIFO buffer system 100 includes a reset logic 136 for generating a reset signal 138 which resets the write pointer 106 and the read pointer 108.

In operation, the data 104 is written into a next available empty memory location of the storage 102 on a rising clock edge and when a write enable signal 118 is high. In one exemplary implementation, a valid write signal 132 enables writing of the data 104 into the storage 102. In one embodiment, the status logic 140 may generate the FULL flag 122 indicating that no more empty locations remain in the storage 102. Further, the data 104 can be read out of the storage 102 (in the order in which it was written) by asserting a read-enable signal 120 prior to a rising clock edge. In one exemplary implementation, a valid read signal 134 enables reading of the data 104 from the storage 102. In one embodiment, the status logic 140 may generate the EMPTY flag 126 indicating that no more data resides in the storage 102.

It should be noted that FIFO buffer status cannot be corrupted by invalid requests (i.e., invalid read signal or invalid write signal). It is appreciated that requesting a read operation while the EMPTY flag 126 is active does not cause any change in a current state of the FIFO buffer system 100. Similarly, requesting a write operation while the FULL flag 122 is active does not cause any change in the current state of the FIFO buffer system 100. If enabled, a read error and write error handshake signals indicate rejection of these invalid requests.

Further, the reset signal 138 resets the write pointer 106 and the read pointer 108 and also initializes the EMPTY signal 126 to 1 and the FULL signal 122 to 0 which empties the storage 102 (discarding any data that is stored in the storage 102 but which had not been read-out).

Figure 2:
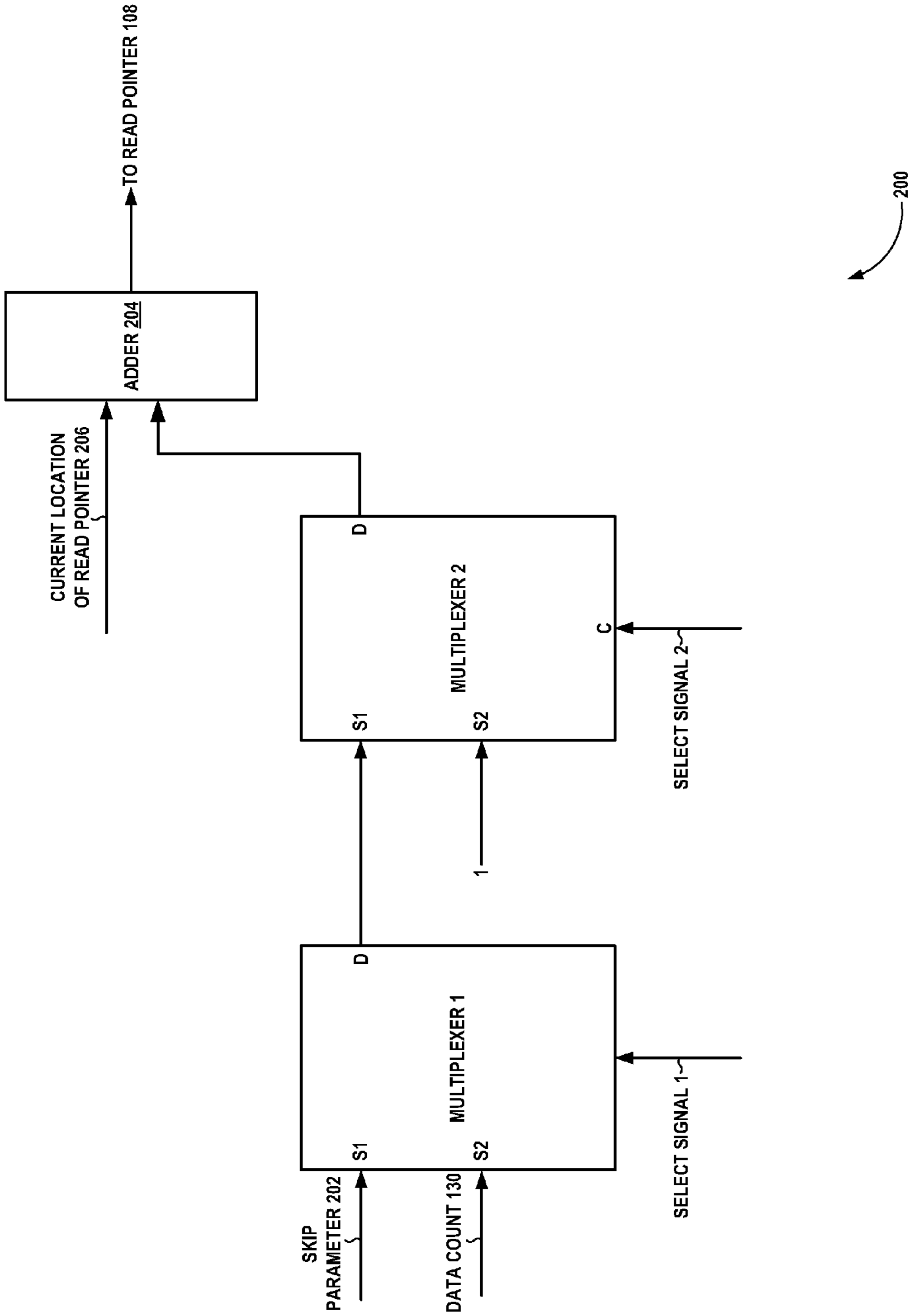
FIG. 2 is a block diagram of an exemplary skip based control logic circuit for the FIFO buffer system of FIG. 1, according to one embodiment.

FIG. 2 is a block diagram of an exemplary skip based control logic circuit 200 of the FIFO buffer system 100 of FIG. 1, according to one embodiment. In one embodiment, the skip based control logic circuit 200 enables skipping a number of locations during a read operation of data using the skip register 114, if the data is determined as invalid. As shown in FIG. 2, the skip based control logic circuit 200 includes a multiplexer 1, a multiplexer 2 and an adder 204 coupled in series.

Further, as shown in FIG. 2, inputs to the multiplexer 1 are a skip parameter 202 and the data count 130 at S1 and S2 respectively. It is appreciated that the skip parameter 202 is an exemplary embodiment of the skip parameter 116 of the skip register 114 of FIG. 1. Also, as shown in FIG. 2, an output of the multiplexer 1 is a first input to the multiplexer 2 at S1.

In operation, the multiplexer 1 selects an output signal based on a select signal 1. In one embodiment, the multiplexer 1 selects S1 as the output signal if the data count 130 of the data 104 is greater than a value of the skip parameter 202. Further, the multiplexer 2 selects an output signal based on a select signal 2. In one embodiment, the multiplexer 2 selects S1 as the output signal if the value of the skip parameter 202 is greater than zero. In an alternate embodiment, the multiplexer 2 selects S2 as the output signal if the value of the skip parameter 202 is not greater than zero. Further, as shown in FIG. 2, the adder 204 generates an output signal by adding the output from the multiplexer 2 to a current location of read pointer 206.

In one embodiment, the skip based control logic circuit 200 increments the read pointer 108 if the data count 130 of the data 104 is greater than the value of the skip parameter 202. In one exemplary implementation, the skip based control logic circuit 200 increments the read pointer 108 by increasing the current location of read pointer 206 by the value of the skip parameter 202. It is appreciated that, when the current location of read pointer 206 is increased by the value of skip parameter 202, the data count 130 is decreased by the value of the skip parameter 202.

In another embodiment, the skip based control logic circuit 200 sets the current location of read pointer 206 to a current location of the write pointer 106 if the value of the skip parameter 202 is greater than zero but greater than the data count 130 of the data 104. Further, the skip based control logic circuit 200 decreases the value of the skip parameter 202 by the data count 130 and sets the data count 130 to zero. The data count 130 when set to zero indicates an empty condition. Further, this results in generation of the EMPTY flag 126 and the HALF EMPTY flag 128.

In one exemplary implementation, setting the data count 130 to zero includes performing another write operation with additional data. In one example embodiment, the read pointer 108 is set by increasing the current location of read pointer 206 by a value of the skip parameter 202 if size of the additional data is greater than the value of the skip parameter 202. It is appreciated that, when the current location of read pointer 206 is increased by the value of the skip parameter 202, the size of the additional data is decreased by the value of the skip parameter 202.

In an alternate embodiment, the skip based control logic circuit 200 is operable for setting the read pointer 108 by increasing the current location of read pointer 206 by one address location in the storage 102 if the skip parameter 202 is a null value. In one exemplary implementation, the skip parameter 202 is set to a null value if the isochronous data packet is determined as valid for the read operation.

Figure 3:
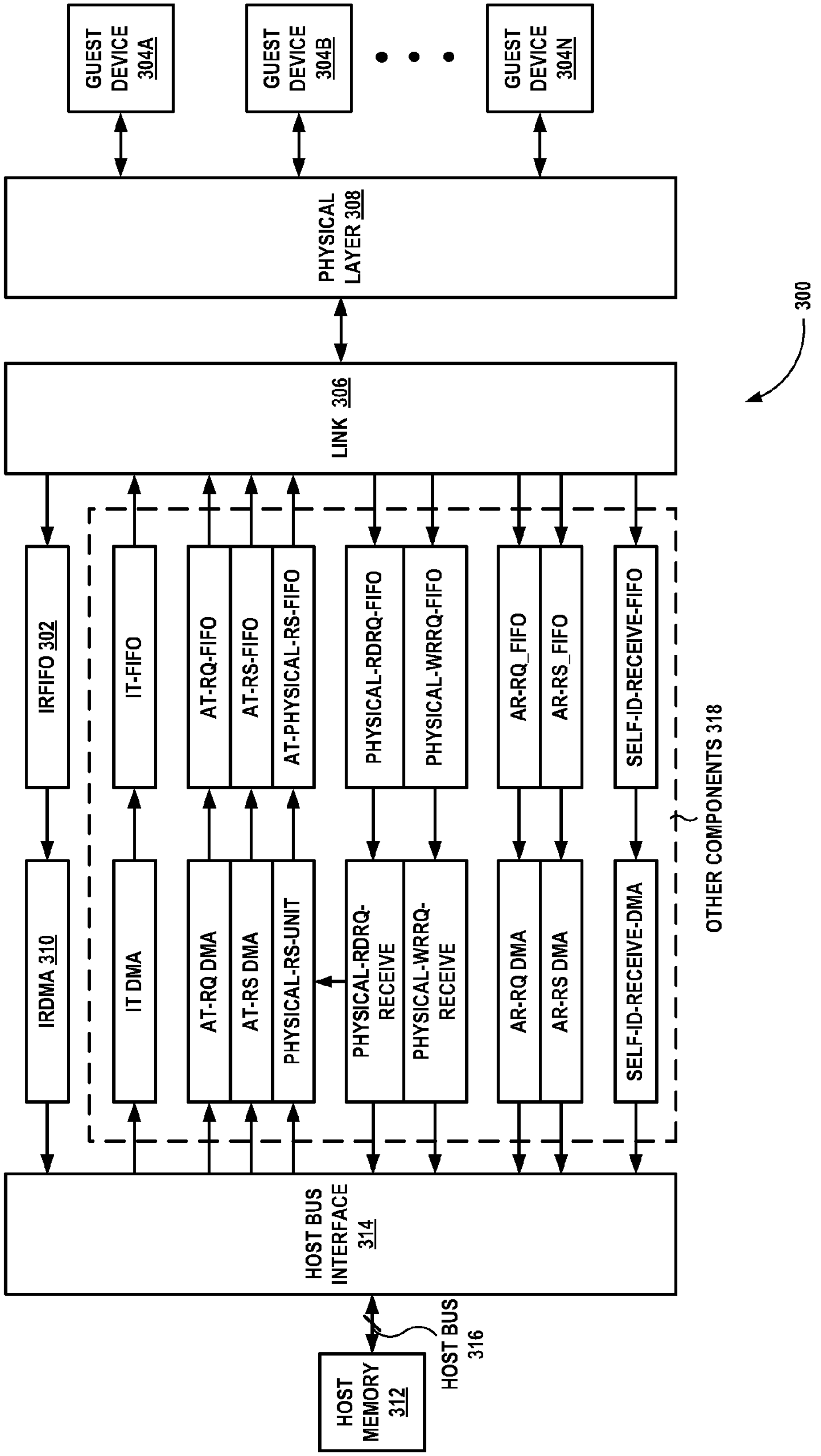
FIG. 3 is a block diagram of an exemplary host controller interface (HCI) device, according to one embodiment.

FIG. 3 is a block diagram of an exemplary host controller interface (HCI) device 300, according to one embodiment. As shown in FIG. 3, the HCI device 300 includes an isochronous receive first in first out (IRFIFO) buffer 302. It is appreciated that the IRFIFO buffer 302 is an exemplary embodiment of the FIFO buffer system 100 of FIG. 1. The IRFIFO buffer 302 includes a storage for storing isochronous data packets received from guest devices 304A through 304N.

In one example embodiment, the IRFIFO buffer 302 is operable for receiving the isochronous data packets from the guest devices 304A through 304N via a link 306 and a physical layer 308. In one embodiment, the link 306 is operable for forwarding received isochronous data packets to the IRFIFO buffer 302 from the physical layer 308. In another embodiment, the link 306 is operable for forwarding outbound isochronous data packets to the physical layer 308. Further, the physical layer 308 is operable for translating logical symbols used by the link 306 into electrical signals on a cable.

Further, the IRFIFO buffer 302 includes a write pointer for pointing to a write address of the storage for a write operation and a read pointer for pointing to a read address of the storage for a read operation. In addition, the IRFIFO buffer 302 includes a control logic for incrementing the read pointer. In one embodiment, the read pointer is incremented by a value of a skip parameter of a skip register if the isochronous data packet is not valid for the read operation. In another embodiment, the skip parameter is set to a null value if the isochronous data packet is valid for the read operation.

It is appreciated that the IRFIFO buffer 302 is operable for detecting the isochronous data packet placed in the IRFIFO buffer 302 and for reading a header of the isochronous data packet. It is also appreciated that the IRFIFO buffer 302 is operable for determining a validity of the isochronous data packet.

As shown in FIG. 3, the HCI device 300 includes an isochronous receive direct memory access (IRDMA) 310 coupled to the IRFIFO buffer 302 for moving the isochronous data packet from the IRFIFO buffer 302 to a host memory 312. Further, as shown in FIG. 3, the HCI device 300 includes a host bus interface 314 coupled to the IRDMA 310 for providing an interface to a host bus 316 by enabling a transaction between the IRDMA 310 and the host bus 316.

In one embodiment, the IRDMA 310 is operable for accessing the host bus 316 to write the isochronous data packet to the host memory 312 via the host bus 316 if the isochronous data packet is valid. In one exemplary implementation, the IRDMA 310 requests an access to the host bus 316. When the host bus 316 grants the access, a descriptor is fetched from the host memory 312. For example, the descriptor provides information associated with the host memory 312. Further, the IRDMA 310 reads the valid isochronous data packet from the IRFIFO buffer 302 and writes the isochronous data packet to the host memory 312 via the host bus 316. Furthermore, as shown in FIG. 3, the HCI device 300 includes other components 318 (e.g., IT DMA, IT FIFO, etc.). Since the other components 318 are well known to a person skilled in the art, the explanation thereof is omitted.

Figure 4A:
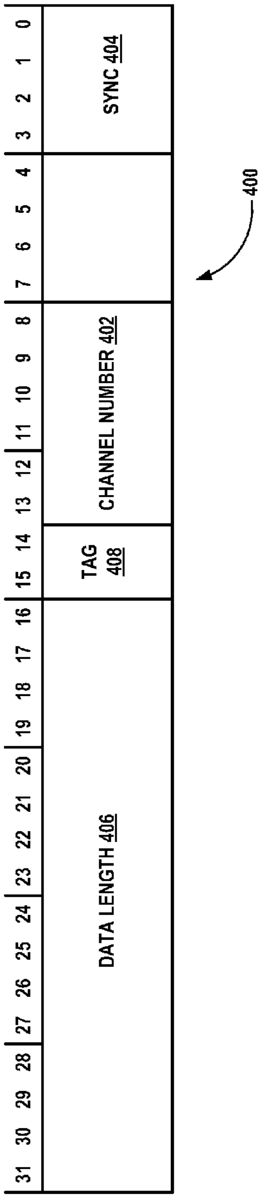
FIG. 4 illustrates a header of an isochronous data packet, a context match register, and a context control register associated with the HCI device of FIG. 3, according to one embodiment.
Figure 4B:
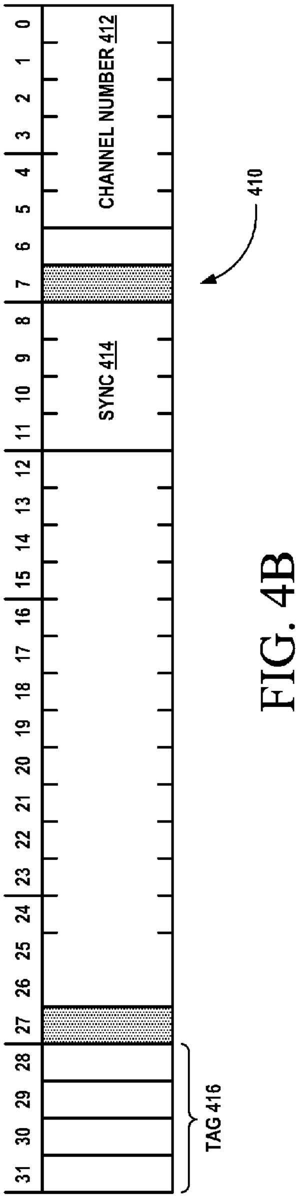
Figure 4C:
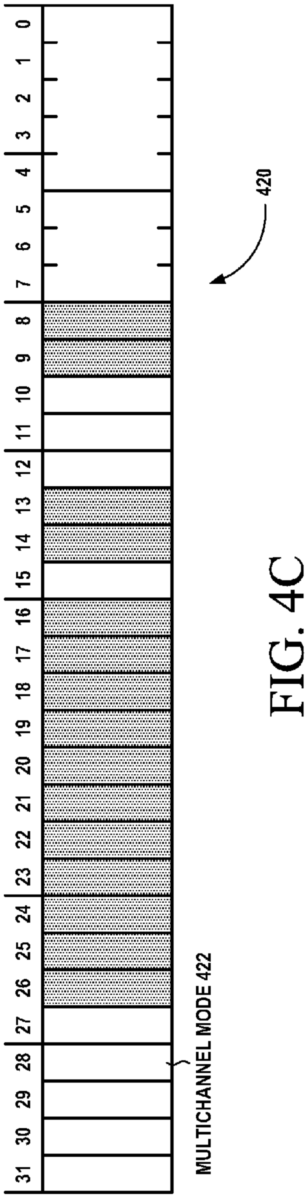

FIG. 4 illustrates a header of an isochronous data packet 400, a context match register 410, and a context control register 420 associated with the HCI device 300 of FIG. 3, according to one embodiment. Particularly, FIG. 4A shows the header of the isochronous data packet 400, FIG. 4B shows the context match register 410, and FIG. 4C shows the context control register 420. In one embodiment, the context match register 410 and the context control register 420 are associated with the IRDMA 310 of the HCI device 300. As shown in FIG. 4A, the header 400 includes a channel number field 402, a sync field 404, a data length field 406 and a tag field 408.

The channel number field 402 indicates a channel number associated with the isochronous data packet. As shown in FIG. 4A, the channel number field 402 is a 6 bit field. Further, the sync field 404 indicates transaction layer specific synchronization bits. As shown in FIG. 4A, the sync field 404 is a 4 bit field. The data length field 406 is a 16 bit field which indicates a number of bytes of the isochronous data packet placed in the IRFIFO buffer 302. Further, the tag field 408 indicates a data format of the isochronous data packet. As shown in FIG. 4A, the tag field 408 is a 2 bit field.

As shown in FIG. 4B, the context match register 410 includes a channel number field 412, a sync field 414 and a tag field 416. The channel number field 412 is a six bit field which indicates a channel number for which the IRDMA context accepts the isochronous data packet. The sync field 414 is a 4 bit field which is compared with the sync field 404 of the isochronous data packet for this channel. The tag field 416 is a 4 bit field which is compared with the tag field 408 of the isochronous data packet for this channel.

As shown in FIG. 4C, the context control register 420 includes a multichannel mode field 422. The multichannel mode field 422 indicates whether a multichannel mode is set to one or zero. In one embodiment, when the multichannel mode is set to 1, corresponding IRDMA context receives the isochronous data packet for all isochronous channels (e.g., enabled in IRChannelMaskHi and IRChannelMaskLo registers). In this embodiment, the channel number 412 specified in the context match register 410 is ignored.

In another embodiment, when the multichannel mode is set to 0, the IRDMA context receives the isochronous data packet for a particular single channel. If more than one context control register 420 has multichannel mode bit set, results are undefined. Since the value of the multichannel mode bit is undefined after reset in all IRDMA contexts, software shall initialize the multichannel mode bit to 0 in all IRDMA contexts to maintain the exclusive nature of the multichannel mode bit.

Figure 5:
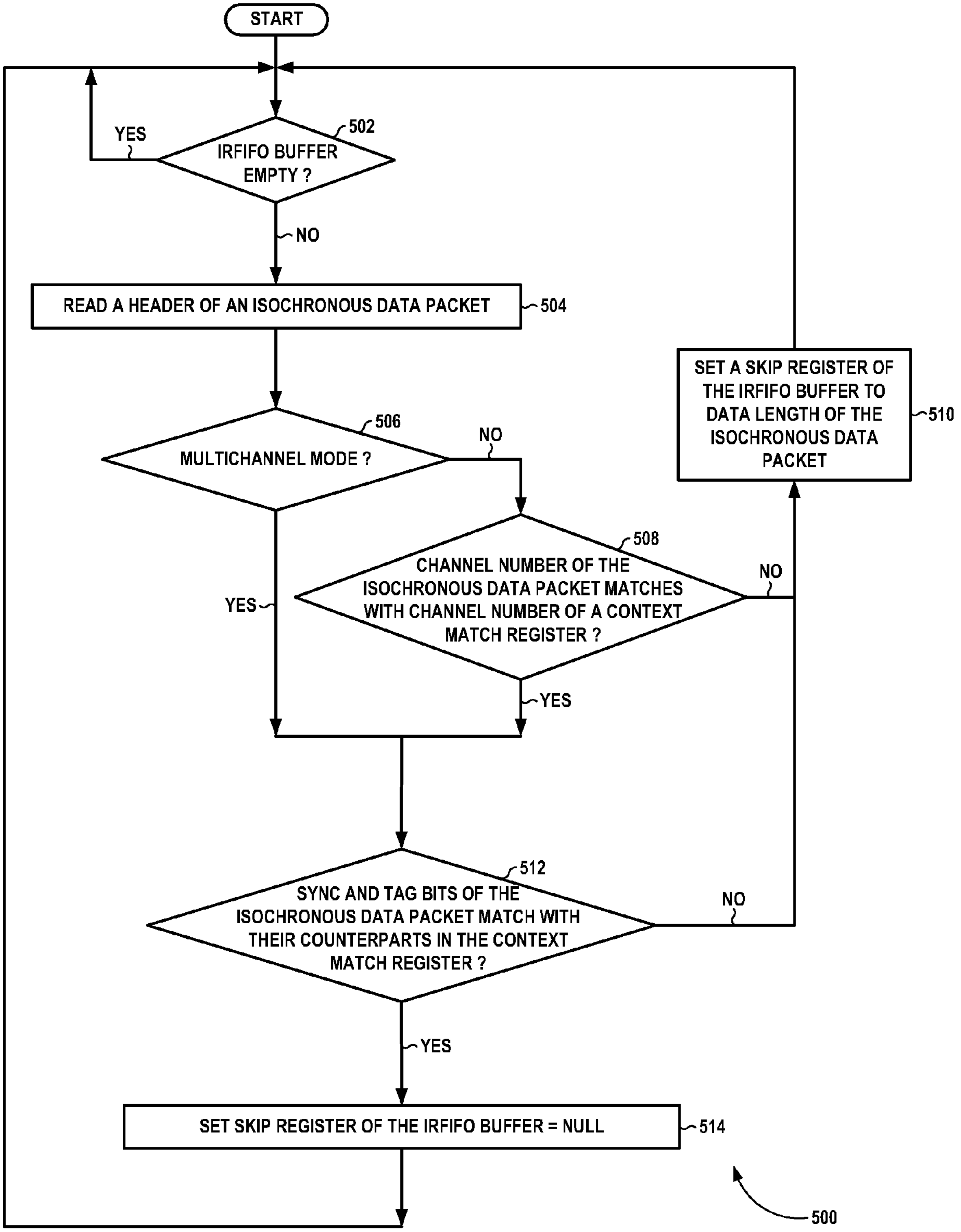
FIG. 5 is a flow chart of an exemplary method for performing a read operation of an isochronous receive first in first out (IRFIFO) buffer of the HCI device of FIG. 3, according to one embodiment.

FIG. 5 is a flow chart of an exemplary method 500 for performing a read operation of an IRFIFO buffer of the HCI device 300 of FIG. 3, according to one embodiment. In step 502, it is determined whether the IRFIFO buffer is empty. In step 504, a header of an isochronous data packet is read if it is determined that the IRFIFO buffer is not empty.

In one exemplary implementation, a channel number and packet filtering controls, such as sync bit and tag bit, of the isochronous data packet is extracted from the header. If, in step 502, it is determined that the IRFIFO buffer is empty, step 502 is repeated until the IRFIFO buffer detects the isochronous data packet placed in the IRFIFO buffer.

In step 506, a check is made to determine whether a multichannel mode associated with a context control register is set or not. If the multichannel mode is not set, then step 508 is performed, else step 512 is performed. In step 508, a check is made to determine whether the channel number of the isochronous data packet matches with a channel number of a context match register associated with the IRDMA. If it is determined that the check made in step 508 is false, then step 510 is performed, else step 512 is performed. In step 510, a skip parameter of a skip register of the IRFIFO buffer is set to a data length of the isochronous data packet. In one embodiment, a read operation of remaining data of the isochronous data packet is skipped as the isochronous data packet is determined as invalid.

In step 512, a check is made to determine whether the packet filtering controls, such as sync and tag bits, of the isochronous data packet match with their counterparts in the context match register. If it is determined that the check made in step 512 is false, then step 510 is performed, else step 514 is performed. In step 514, the skip parameter of the skip register is set to a null value. In one embodiment, the skip parameter is set to a null value when the data packet is determined as valid for the read operation. Furthermore, steps 502 to 514 are repeated for a next isochronous data packet upon performing the step 514.

Figure 6:
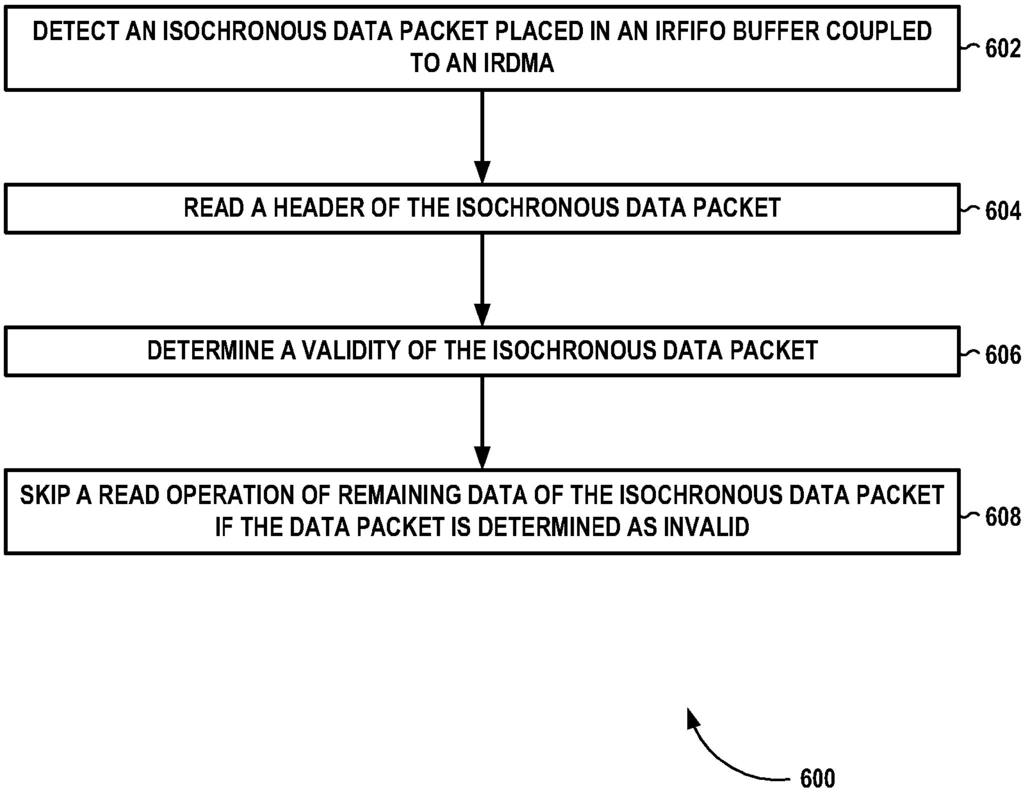
FIG. 6 is a process flow chart of an exemplary method for performing a read operation of an IRFIFO buffer of the HCI device of FIG. 3, according to one embodiment.

FIG. 6 is a process flow chart of an exemplary method for performing a read operation of an IRFIFO buffer of the HCI device 300 of FIG. 3, according to one embodiment. In operation 602, an isochronous data packet placed in the IRFIFO buffer coupled to an IRDMA is detected. In operation 604, a header of the isochronous data packet is read.

In operation 606, a validity of the isochronous data packet is determined. In one exemplary implementation, the validity of the isochronous data packet is determined by extracting a channel number and packet filtering controls from the header and comparing the channel number and the packet filtering controls with contents of control registers (e.g., a context match register and a context control register) associated with the IRDMA.

In operation 608, a read operation of remaining data of the isochronous data packed is skipped (without issuing any more reads), if the isochronous data packet is determined as invalid. In one example embodiment, a read pointer of the IRFIFO buffer is incremented by a size of the remaining data. Moreover, the above-described method may be in form of a machine-readable medium embodying a set of instructions that, when executed by a machine, causes the machine to perform the method of FIG. 3.

The above-described method and system provides an option to skip a read pointer (by a user configurable value per access), thereby saving processing cycles of a controller (to which the FIFO buffer system is interfaced) and also reducing latency while processing an invalid isochronous packet. For example, assume that an invalid isochronous data packet of size 4 KB is to be consumed by an IRDMA. Further, an IRFIFO buffer is assumed to be of 8 bits. For reading a header of the invalid isochronous data packet of 8 bytes, 8 processing cycles are required. In conventional technique, for reading the data of the invalid isochronous data packet of size 4 KB by issuing dummy reads, 4088 processing cycles are required. Thus, in conventional technique, total number of processing cycles required for reading the invalid isochronous data packet of 4 KB is 4088+8 (i.e., 4096) cycles.

In contrast, if an IRFIFO buffer with a skip register is used, total of 96 (i.e., 8+88) processing cycles are required for reading the invalid isochronous data packet of 4 KB, i.e., 8 processing cycles for reading the header of the invalid isochronous data packet and a maximum of 88 processing cycles for configuring the skip register of the IRFIFO buffer. From the above example, it can be inferred that a saving in the processing cycles for reading the invalid isochronous data packet of size 4 KB is 97% (i.e., 4000/4096). Also, reduction in latency in processing a next isochronous data packet is 97%.

Further, the above described method and/or system can be used in embedded system environments where a low level firmware reads a header of an isochronous data packet, determines the validity of the isochronous data packet and discards if the isochronous data packet is determined as invalid by using a skip based control logic. Also, in the above described method, it is easy to configure the forward skipping read FIFO buffer.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuitry (ASIC)).

What is claimed is:

1. A first in and first out (FIFO) buffer system, comprising:
- a storage device for storing data;
- a write pointer for pointing to a write address of the storage device for a write operation;
- a read pointer for pointing to a read address of the storage device for a read operation; and
- a control logic for incrementing the read pointer based on a skip parameter of a skip register, wherein the skip parameter is used to characterize a validity of the data for the read operation, and wherein the skip register is a configurable register which enables skipping a number of locations for a read operation, wherein the control logic comprises a skip based control logic circuit for:
  - setting a current location of the read pointer to a current location of the write pointer if a value of the skip parameter is greater than zero and a data count of the data;
  - decreasing the value of the skip parameter by the data count; and,
  - setting the data count to zero.

2. The system of claim 1, wherein the control logic comprises the skip based control logic circuit for performing the incrementing the read pointer by increasing the current location of the read pointer by the value of the skip parameter if the data count of the data is greater than the value of the skip parameter.

3. The system of claim 2, wherein the increasing the current location of the read pointer by the value of the skip parameter further comprises decreasing the data count by the value of the skip parameter.

4. The system of claim 1, wherein the control logic comprises the skip based control logic circuit operable for setting the read pointer by increasing the current location of the read pointer by one address location in the storage device if the skip parameter is a null value.

5. The system of claim 4, wherein the increasing the current location of the read pointer by the one address location further comprises decreasing the data count by the one address location.

6. The system of claim 1, wherein the setting the data count to zero further comprises performing another write operation with additional data.

7. The system of claim 6, wherein the read pointer is set by increasing the current location of the read pointer by the value of the skip parameter if a size of the additional data is greater than the value of the skip parameter.

8. The system of claim 7, wherein the increasing the current location of the read pointer by the value of the skip parameter further comprises decreasing the size of the additional data by the value of the skip parameter.

9. The system of claim 2, wherein the skip based control logic circuit comprises two multiplexers and an adder coupled in series.

10. A method for a first in and first out (FIFO) buffer system, comprising:
- storing data on a storage device;
- pointing to a write address of the storage device for a write operation using a write pointer;
- pointing to a read address of the storage device for a read operation using a read pointer;
- incrementing the read pointer using a control logic based on a skip parameter of a skip register, wherein the skip parameter is used to characterize a validity of the data for the read operation, and wherein the skip register is a configurable register which enables skipping a number of locations for a read operation;
- setting a current location of the read pointer to a current location of the write pointer if a value of the skip parameter is greater than zero and a data count of the data, wherein the control logic comprising a skip based control logic circuit sets the current location of the read pointer;
- decreasing the value of the skip parameter by the data count using the skip based control logic circuit; and,
- setting the data count to zero using the skip based control logic circuit.

11. The method of claim 10, wherein incrementing the read pointer comprises increasing the current location of the read pointer by the value of the skip parameter if the data count of the data is greater than the value of the skip parameter, wherein the control logic comprising the skip based control logic circuit increases the current location of the read pointer.

12. The method of claim 11, wherein the increasing the current location of the read pointer by the value of the skip parameter further comprises decreasing the data count by the value of the skip parameter.

13. The method of claim 10, further comprising setting the read pointer by increasing the current location of the read pointer by one address location in the storage device if the skip parameter is a null value, wherein the control logic comprising the skip based control logic circuit sets the read pointer.

14. The method of claim 13, wherein the increasing the current location of the read pointer by the one address location further comprises decreasing the data count by the one address location.

15. The method of claim 10, wherein the setting the data count to zero further comprises performing another write operation with additional data.

16. The method of claim 15, further comprising setting the read pointer by increasing the current location of the read pointer by the value of the skip parameter if a size of the additional data is greater than the value of the skip parameter.

17. The method of claim 16, wherein the increasing the current location of the read pointer by the value of the skip parameter further comprises decreasing the size of the additional data by the value of the skip parameter.

18. A computer program stored on a non-transitory computer readable storage medium comprising instructions that, when executed by a computing platform, result in execution of a method for a first in and first out (FIFO) buffer system, comprising:

storing data on a storage device;

pointing to a write address of the storage device for a write operation using a write pointer;

pointing to a read address of the storage device for a read operation using a read pointer; and incrementing the read pointer using a control logic based on a skip parameter of a skip register, wherein the skip parameter is used to characterize a validity of the data for the read operation, and wherein the skip register is a configurable register which enables skipping a number of locations for a read operation, wherein the control logic comprises a skip based control logic circuit for:

setting a current location of the read pointer to a current location of the write pointer if a value of the skip parameter is greater than zero and a data count of the data;

decreasing the value of the skip parameter by the data count; and, setting the data count to zero.

* * * * *